United States Patent
Kosaka (10) Patent No.: US 9,781,347 B2
(45) Date of Patent: Oct. 3, 2017

(54) IMAGE PICKUP APPARATUS HAVING LIVE VIEW FUNCTION, AND METHOD OF CONTROLLING THE SAME

(71) Applicant: CANON KABUSHIKI KAISHA, Tokyo (JP)

(72) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/963,595

(22) Filed: Dec. 9, 2015

(65) Prior Publication Data
US 2016/0182795 A1 Jun. 23, 2016

(30) Foreign Application Priority Data
Dec. 17, 2014 (JP) .................... 2014-255034

(51) Int. Cl.
H04N 5/232 (2006.01)
H04N 5/235 (2006.01)

(52) U.S. Cl.
CPC ....... *H04N 5/23293* (2013.01); *H04N 5/2352* (2013.01)

(58) Field of Classification Search
None
See application file for complete search history.

(56) References Cited

U.S. PATENT DOCUMENTS 7,515,813 B2 * 4/2009 Shibutani .......... H04N 1/32128
386/239

FOREIGN PATENT DOCUMENTS

JP H05-061097 A 3/1993
JP H11-298791 A 10/1999

* cited by examiner

*Primary Examiner* — Mark T Monk
(74) *Attorney, Agent, or Firm* — Fitzpatrick, Cella, Harper & Scinto (57) ABSTRACT

An exposure control technique that makes it possible, even when photographing is performed in an enlarged display state of live view, to obtain an image photographed with correct exposure, by causing a setting shifting function to operate. When an enlargement instruction is received from a user when images acquired by an image pickup device are being sequentially displayed on an image display section, a camera control circuit causes an enlarged image corresponding to a partial area of an object area to be displayed on the image display section. If an exposure is to be changed when the enlarged image is being displayed, the camera control circuit changes the exposure, based on a result of photometry of the image acquired by the image pickup device before the enlarged image is displayed on the image display section.

12 Claims, 10 Drawing Sheets

IMAGE PICKUP APPARATUS HAVING LIVE VIEW FUNCTION, AND METHOD OF CONTROLLING THE SAME

BACKGROUND OF THE INVENTION

Field of the Invention

The invention relates to an image pickup apparatus, such as a digital camera, and more particularly to an exposure control technique for an image pickup apparatus having a live view function.

Description of the Related Art

Image pickup apparatuses, such as a digital camera, include one having a live view function. The live view function is a function that makes it possible to check an object image by sequentially outputting image signals continuously read out from an image pickup device and displaying images based on the image signals on an image display section, such as an LCD, provided e.g. on a rear surface of the image pickup apparatus.

Further, there has been proposed a technique in which, for focus checking purposes, a function of displaying a photographed image in an enlarged state on the image display section is added to the live view function (see Japanese Patent Laid-Open Publication No. H11-298791). According to the proposed technique, an image of a predetermined portion of the photographed image read out from the image pickup device is enlarged and displayed on the image display section. For enlarged display, there have been proposed a method of cutting out a partial area from a full-screen photographed image read out from the image pickup device, and a method of reading out only a partial area of a photographed image from the image pickup device in advance and displaying the image of the read area.

In the live view display, the reading frame rate is preferably a high-speed frame rate from the viewpoint of smoothness of a displayed image, and to realize the high-speed frame rate, a method is generally employed in which pixel signals for photographing a still image are read out by thinning out the same. Further, when a partial area is read out in advance for display, with a reduced thinning-out ratio setting compared with a case of the full-screen live view, image quality of the enlarged display becomes higher than when a partial area is cut out for display from the thinned-out image signals for the live view display, so that the display becomes more suitable for focus checking.

Further, there have also been proposed image pickup apparatuses having a plurality of live view display modes. For example, there has been proposed an image pickup apparatus which is capable of selecting between a mode in which live view exposure control is performed based on an exposure target value which is different from a value for use during still image photographing so as to always ensure a proper level of brightness of a live view display image, and a mode in which the live view exposure control is performed based on the same exposure target value as the value for use during still image photographing.

On the other hand, exposure modes of a camera include not only a program AE mode in which a shutter speed and an aperture value are automatically determined, but also a manual exposure mode in which one or both of the shutter speed and the aperture value is/are set by a user, a shutter speed priority mode, and an aperture priority mode. In these modes, there is a case where an image having a proper brightness cannot be photographed depending on values set by the user and object conditions.

To solve this problem, there has been proposed a technique for changing one or both of the exposure factors (shutter speed and aperture value), which were manually set, to a proper value or proper values with an accuracy with which manual setting can be performed, based on a result of photometry performed by a photometry unit (see Japanese Patent Laid-Open Publication No. H05-61097).

Further, there has been disclosed a setting shifting function for temporarily changing the shutter speed setting while a release button is being half-pressed, in a case where the shutter speed set in the shutter speed priority mode cannot achieve a correct exposure in a range within which the aperture value is set in a manner interlocked with the shutter speed. Further, there has also been disclosed a setting shifting function for temporarily changing the aperture setting while the release button is being half-pressed, in a case where the aperture value set in the aperture priority mode cannot achieve a correct exposure in a range within which the shutter speed is set in a manner interlocked with the aperture value.

The photometry during the live view display is performed using image signals read out from the image pickup device. More specifically, each analog image signal output from the image pickup device is converted to a digital image signal by an analog-to-digital converter, and then is used for photometry. A range of photometry luminance detected from image signals read out from the image pickup device at once is determined depending on dynamic range characteristics of the analog-to-digital converter, and for example, if the output of the analog-to-digital converter is 14-bit, the photometry luminance range corresponds to approximately ±three steps.

Here, photometry control performed during the live view display will be described with reference to FIG. 8. When measuring a luminance of an object having a brightness more than three steps beyond the brightness as a control target of the live view, it is necessary to perform photometric operation a plurality of times due to the above-mentioned restriction of the photometry luminance range.

For example, assuming that the shutter speed is set to $\frac{1}{8000}$ sec in the shutter speed priority mode, and photographing is to be performed at an ISO value of 100, a lens having an open F number of 1.8 makes it possible to receive an appropriate amount of light from an object of which the correct exposure is achieved at an EV of 17. On the other hand, in a case where an object of which the correct exposure is achieved at an EV of 9 is to be photographed, the amount of received light becomes insufficient, resulting in an underexposed photograph. In this case, if the camera is in a mode for performing the exposure control of the live view display using the same exposure target value as that for the exposure control during still image photographing (hereinafter referred to as the exposure simulation mode), the object image is darkly displayed on the image display section.

The user viewing the image display section becomes aware that the exposure is not correct, and can photograph a correctly exposed image by changing the shutter speed setting and the ISO sensitivity setting. However, if the camera is equipped with the above-described setting shifting function, it is possible to photograph a correctly exposed image without having the settings changed by the user.

Figure 8:
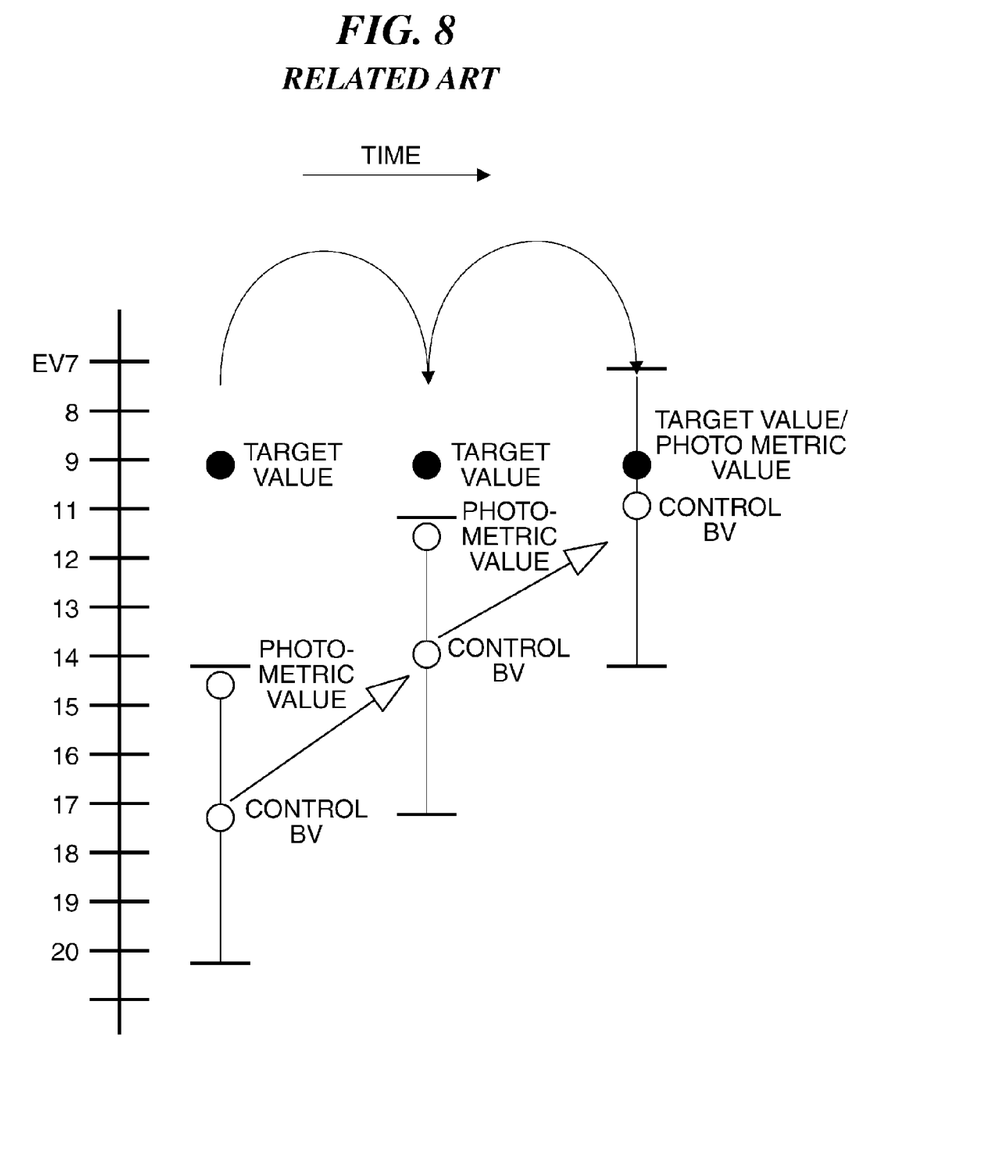
FIG. 8 is a schematic diagram of photometric control performed during the live view display.

In the example illustrated in FIG. 8, the image display targeting a brightness corresponding to an EV of 17 in the exposure simulation mode is performed based on the shutter speed set by the user and the open F number of the lens in use. When the release button is half-pressed in this state, the setting shifting function operates, and by adjusting the photometry target value while performing photometric operation a plurality of times due to the above-mentioned restriction of the photometry luminance range, it is possible to calculate a final setting shift amount.

On the other hand, in a case where image signals of a partial area are read out from the image pickup device and used for enlarged display of the live view, image signals of the full screen cannot be acquired during the enlarged display, and hence such adjusting of the photometry target value as described above cannot be performed, so that it is impossible to calculate an accurate setting shift amount. In short, in a case where photographing is performed in the enlarged display state of live view, there is a possibility that an image photographed with correct exposure cannot be obtained.

SUMMARY OF THE INVENTION

The invention provides an exposure control technique that makes it possible, even when photographing is performed in an enlarged display state of live view, to obtain an image photographed with correct exposure, by causing a setting shifting function to operate.

In a first aspect of the present invention, there is provided an image pickup apparatus comprising an image pickup device, a photometry unit configured to perform photometry of an image acquired by performing image pickup by the image pickup device, an exposure control unit configured to perform exposure control based on a result of photometry by the photometry unit, and a display control unit configured to cause the image acquired by performing image pickup by the image pickup device to be displayed on an image display section, wherein in a case where an enlargement instruction is received from a user when a plurality of images acquired by performing image pickup by the image pickup device are being sequentially displayed on the image display section, the display control unit causes an enlarged image corresponding to a partial area of an object area as a target of image pickup by the image pickup device to be displayed on the image display section, and wherein in a case where an exposure is to be changed when the enlarged image is being displayed on the image display section, the exposure control unit changes the exposure, based on a result of photometry of the image acquired by performing image pickup by the image pickup device before the enlarged image is displayed on the image display section.

In a second aspect of the present invention, there is provided an image pickup apparatus comprising an image pickup device, a photometry unit configured to perform photometry of an image acquired by performing image pickup by the image pickup device, an exposure control unit configured to perform exposure control based on a result of photometry by the photometry unit, and a display control unit configured to cause the image acquired by performing image pickup by the image pickup device to be displayed on an image display section, wherein in a case where an enlargement instruction is received from a user when a plurality of images acquired by performing image pickup by the image pickup device are being sequentially displayed on the image display section, the display control unit causes an enlarged image corresponding to a partial area of an object area as a target of image pickup by the image pickup device to be displayed on the image display section, and wherein in a case where an instruction for still image photographing is received when the enlarged image is being displayed on the image display section, the exposure control unit determines an exposure at a time of still image photographing based on a result of photometry of the image acquired by performing image pickup by the image pickup device before the enlarged image is displayed on the image display section.

In a third aspect of the present invention, there is provided a method of controlling an image pickup apparatus including an image pickup device and an image display section, comprising performing photometry of an image acquired by performing image pickup by the image pickup device, performing exposure control based on a result of the photometry, and displaying the image acquired by performing image pickup by the image pickup device on the image display section, wherein said displaying includes, in a case where an enlargement instruction is received from a user when a plurality of images acquired by performing image pickup by the image pickup device are being sequentially displayed on the image display section, displaying an enlarged image corresponding to a partial area of an object area as a target of image pickup by the image pickup device on the image display section, and wherein the exposure control includes, in a case where an exposure is to be changed when the enlarged image is being displayed on the image display section, changing the exposure based on a result of photometry of the image acquired by performing image pickup by the image pickup device before the enlarged image is displayed on the image display section.

In a fourth aspect of the present invention, there is provided a method of controlling an image pickup apparatus including an image pickup device and an image display section, comprising performing photometry of an image acquired by performing image pickup by the image pickup device, performing exposure control based on a result of the photometry, and displaying the image acquired by performing image pickup by the image pickup device on the image display section, wherein said displaying includes, in a case where an enlargement instruction is received from a user when a plurality of images acquired by performing image pickup by the image pickup device are being sequentially displayed on the image display section, displaying an enlarged image corresponding to a partial area of an object area as a target of image pickup by the image pickup device on the image display section, and wherein the exposure control includes, in a case where an instruction for still image photographing is received when the enlarged image is being displayed on the image display section, determining an exposure at a time of still image photographing based on a result of photometry of the image acquired by performing image pickup by the image pickup device before the enlarged image is displayed on the image display section.

According to the invention, even when photographing is performed in the enlarged display state of live view, it is possible to obtain an image photographed with correct exposure by causing the setting shifting function to operate.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
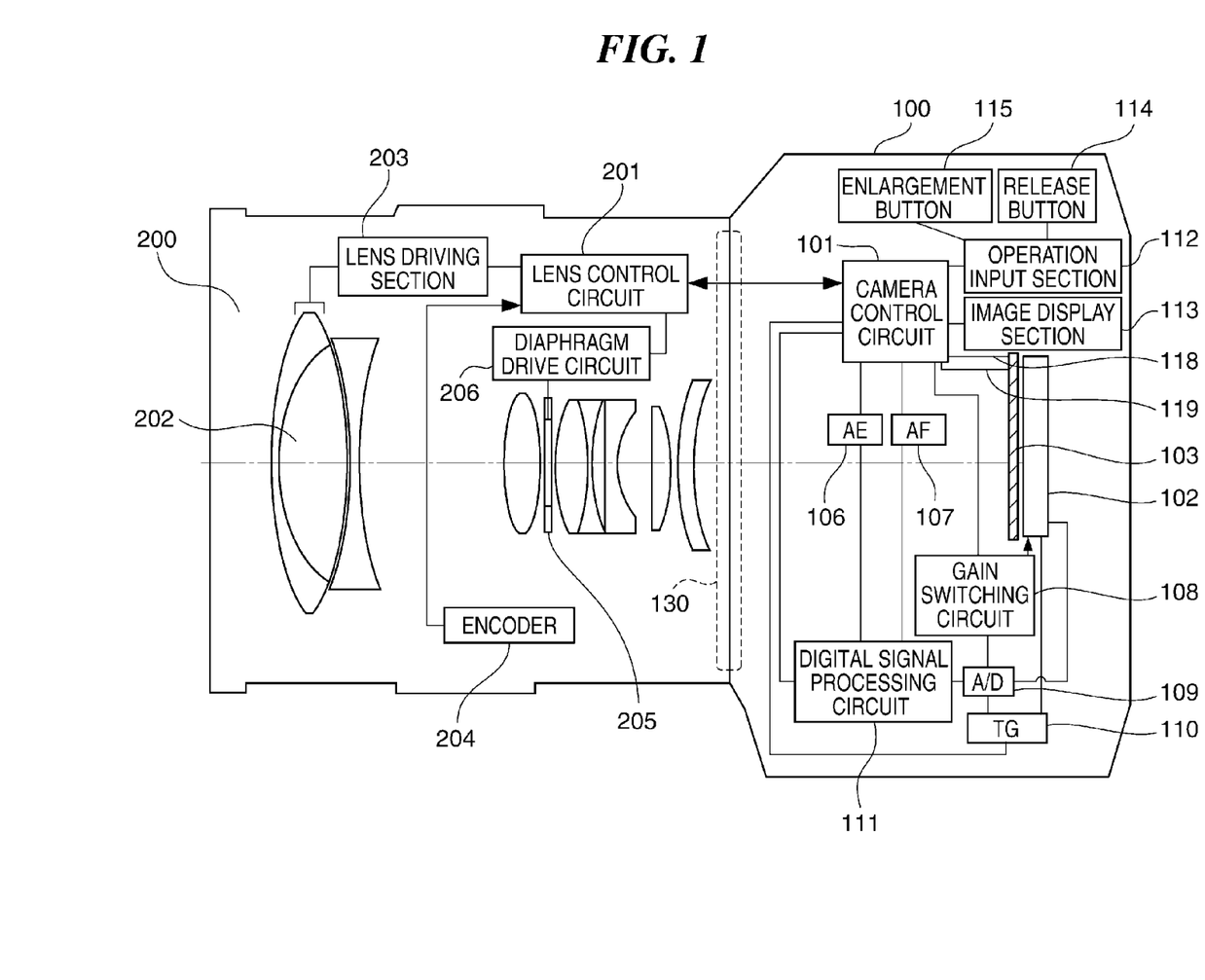
FIG. 1 is a block diagram of a digital single-lens reflex camera as an image pickup apparatus according to a first embodiment of the invention.

FIG. 1 is a block diagram of a digital single-lens reflex camera as an image pickup apparatus according to a first embodiment of the invention.

The digital single-reflex camera as the image pickup apparatus according to the present embodiment has a camera body 100 on which an interchangeable lens unit 200 is removably mounted, as shown in FIG. 1.

First, a description will be given of the construction of the camera body 100.

Referring to FIG. 1, a camera control circuit 101, which is implemented by a microcomputer, controls the overall operation of the camera, and also performs various condition determinations. An image pickup device 102, which is implemented by a CCD sensor or a CMOS sensor, includes an infrared cut filter, a low-pass filter, and so forth. An object image having passed through a lens group 202 of the lens unit 200 is formed on the image pickup device 102.

A shutter 103, which includes a control circuit, not shown, is closed to shield light when reading out a photographed image, and is opened to guide an object light flux to the image pickup device 102 when displaying the live view or performing photographing. The control circuit included in the shutter 103 controls the operation of the shutter 103 according to a signal received from the camera control circuit 101 via a shutter drive signal line 118. In the present embodiment, a focal plane shutter is used as the shutter 103, and a shutter drive magnet as a component of the focal plane shutter is controlled to cause a shutter curtain to run to thereby perform an exposure operation. Note that during the live view display, in place of the exposure operation caused by running of the focal plane shutter, there is performed an exposure operation which controls timing of exposing the image pickup device 102, i.e. an exposure operation by so-called electronic shuttering. Electronic shuttering is performed by the camera control circuit 101 and a timing generator (TG) 110, referred to hereinafter, by controlling the exposure start timing and the exposure termination timing by a known method such that the exposure period becomes a length corresponding to the shutter speed. Further, the shutter 103 incorporates a photo interrupter that detects a position of a shutter blade, and detects the timing of completion of shutter running and like timing, and a detection signal from the photo interrupter is output to the camera control circuit 101 via a signal line 119.

A photometry circuit (AE) 106 performs photometric control by performing arithmetic processing on an image signal output from the image pickup device 102, which has been converted from analog to digital by an analog-to-digital converter 109, through cooperation with a digital signal processing circuit 111. A focus detection circuit (AF) 107 performs focus detection control by performing arithmetic processing on the image signal output from the image pickup device 102, which has been converted from analog to digital by the analog-to-digital converter 109, through cooperation with the digital signal processing circuit 111.

A gain switching circuit 108 is a circuit for switching a gain for amplifying the image signal to be output from the image pickup device 102. The gain switching is controlled by the camera control circuit 101 based on the photographing condition, a user input, and so forth.

The analog-to-digital converter 109 converts the analog image signal amplified and output from the image pickup device 102 to a digital image signal, and the timing generator (TG) 110 synchronizes the input of the amplified analog image signal from the image pickup device 102 with the conversion by the analog-to-digital converter 109. The digital signal processing circuit 111 performs image processing on the image data which has been converted to the digital image signal by the analog-to-digital converter 109 according to parameters. Note that a description of a storage unit, such as a memory, for storing image data processed by the digital signal processing circuit 111 is omitted.

A lens mount 130 is an interface with a lens control circuit 201 of the lens unit 200, and includes a communication terminal for performing data communication between the lens control circuit 201 and the camera control circuit 101. By this communication, the camera control circuit 101 in the camera body 100 can determine the type and various conditions of the lens unit 200.

An operation input section 112 includes not only a release button 114 and an enlargement button 115, but also various input buttons and switches. The various input buttons and switches include switches and buttons for switching between photometric modes including an evaluation photometric mode and a spot photometric mode, and for switching between a desired AF area selection mode and a multi-point/face tracking mode, and a dial for switching between photographing modes including a shutter speed priority mode and an aperture priority mode. When the release button 114 is half-pressed, a first switch SW1 is switched on whereby instructions for AF, AE, etc. are issued to perform a photographing preparation operation. When the release button 114 is fully pressed, a second switch SW2 is switched on to perform an exposure operation (photographing operation).

An image display section 113 is comprised of an LCD and an LED, and displays various modes which have been set, other photographing information, and so forth. Further, the image display section 113 is controlled by the camera control circuit 101 such that the image display section 113 performs the live view display for sequentially displaying through images which are continuously read out from the image pickup device 102 and sequentially output.

Next, the construction of the lens unit 200 will be described.

The lens control circuit 201, which is implemented by a microcomputer, controls the operations of sections of the lens unit 200 and further performs various condition determinations. The lens group 202 is formed by a plurality of photographic lenses, and also includes a focus lens that moves in a direction of an optical axis to thereby adjust focusing. A lens driving section 203 drives lenses of the lens group 202 for focus detection and focusing.

An amount of driving the lens group 202 is calculated by the camera control circuit 101 based on the output from the focus detection circuit 107 of the camera body 100. An encoder 204 detects a position of the lens group 202 when the lens group 202 is driven.

The amount of driving the lens group 202, which is calculated by the camera control circuit 101, is sent from the camera control circuit 101 to the lens control circuit 201, and the lens control circuit 201 controls the lens driving section 203 based on the position information detected by the encoder 204 to thereby move the lens group 202 to an in-focus position. Further, when detecting focus, a direction and a speed of driving the lens group 202 are sent from the camera control circuit 101 to the lens control circuit 201. The lens control circuit 201 controls the lens driving section 203 based on the information of the driving direction and the driving speed sent from the camera control circuit 101 to thereby drive the lens group 202.

A diaphragm 205 is driven by a diaphragm drive circuit 206 to thereby adjust the amount of light passing through the lens group 202. The lens control circuit 201 controls the diaphragm drive circuit 206 to thereby control the driving of the diaphragm 205. A diaphragm driving amount required to control the diaphragm 205 is sent from the camera control circuit 101 to the lens control circuit 201. Note that the focal length of the lens group 202 may be that of a single focus lens or may be variable as in the case of a zoom lens.

Next, an exposure control process performed during the live view display by the digital single-lens reflex camera constructed as above will be described with reference to FIGS. 2A and 2B. The exposure control process in FIGS. 2A and 2B is performed by a CPU, not shown, or the like of the camera control circuit 101, which loads a control program stored e.g. in a ROM, not shown, of the camera body 100, into a RAM, not shown.

Figure 2A:
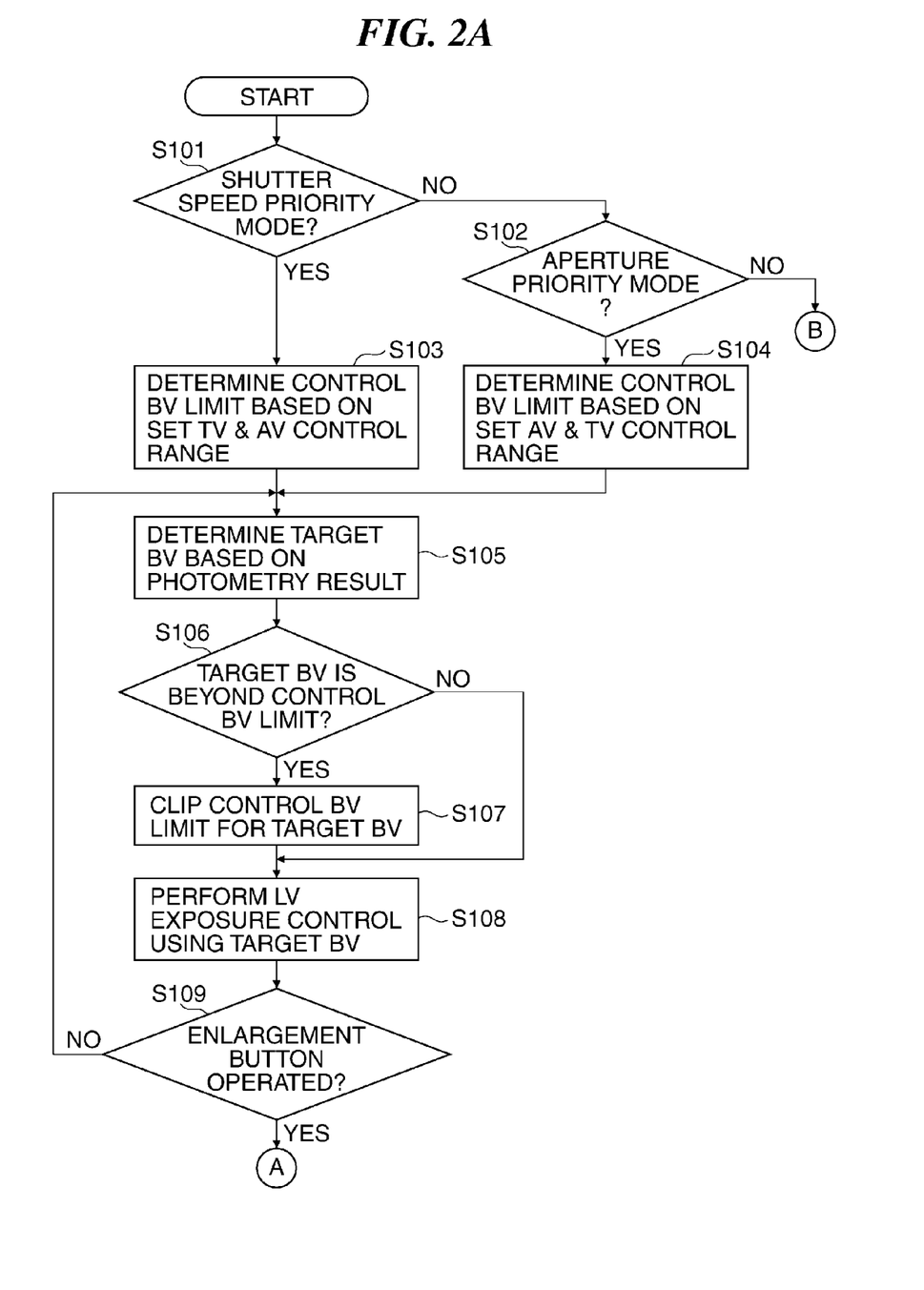
FIG. 2A is a flowchart of an exposure control process performed by the digital single-lens reflex camera during live view display.
Figure 2B:
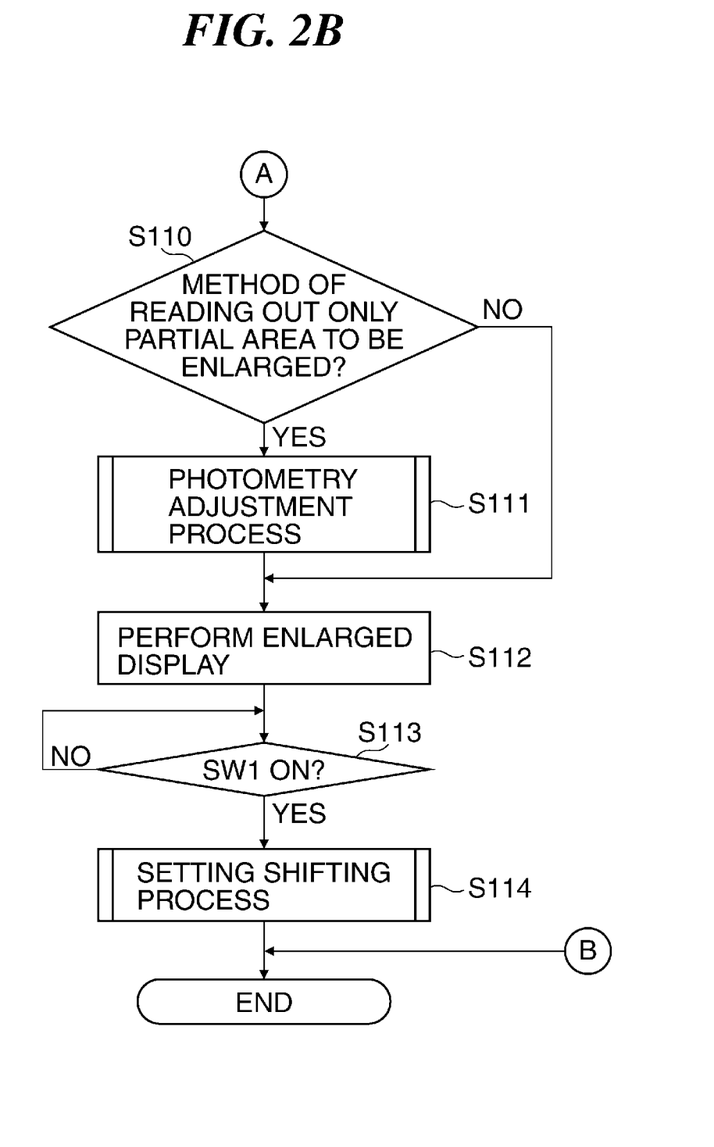
FIG. 2B is a continuation of FIG. 2A.

Referring to FIGS. 2A and 2B, in a step S101, the camera control circuit 101 determines whether or not the photographing mode set via the operation input section 112 is the shutter speed priority mode. Then, if the photographing mode is the shutter speed priority mode, the camera control circuit 101 proceeds to a step S103, whereas if not, the camera control circuit 101 proceeds to a step S102.

In the step S102, the camera control circuit 101 determines whether or not the photographing mode set via the operation input section 112 is the aperture priority mode, and if the photographing mode is the aperture priority mode, the camera control circuit 101 proceeds to a step S104, whereas if not, the camera control circuit 101 terminates the present process.

In the present embodiment, if the photographing mode set via the operation input section 112 is neither the shutter speed priority mode nor the aperture priority mode, it is judged that conditions for performing a setting shifting process, described hereinafter, are not satisfied, and hence the process is immediately terminated.

In the step S103, the camera control circuit 101 determines a range (control BV limit) of an exposure control BV (Brightness Value) for use in the shutter speed priority mode, based on the set shutter speed and an aperture control range of the lens unit 200 mounted on the camera body 100, and proceeds to a step S105. The description of the present example is given assuming that the ISO sensitivity is set to a desired ISO value of 100. The exposure control BV represents a luminance level, and is calculated by the following equations (1) and (2) using a known APEX (Additive System of Photographic Exposure) operation:

$$EV=BV+SV=TV+AV \quad (1)$$

$$BV=TV+AV-SV \quad (2)$$

In these equations, TV (Time Value) represents a shutter speed, AV represents an aperture value, SV (Speed Value) represents an ISO sensitivity value, and EV represents an exposure value.

In a case where the shutter speed is set to $1/8000$ sec, if the lens unit 200 mounted on the camera body 100 has an open F number of 1.8, an EV of 17 is a lower limit of the correct exposure value. The ISO value of 100 is defined as 5 in terms of the APEX value, and hence the control BV limit on the low luminance side is a BV of 12.

In the step S104, the camera control circuit 101 determines a control BV limit for use in the aperture priority mode, based on the set aperture value and a shutter speed control range of the shutter 103 of the camera body 100, and proceeds to the step S105.

In the step S105, the camera control circuit 101 determines a BV which is an exposure control target (hereinafter referred to as the target BV) based on a result obtained by actually performing the photometry, and proceeds to a step S106.

In the step S106, the camera control circuit 101 determines whether or not the target BV exceeds the control BV limit, and if the target BV exceeds the control BV limit, the camera control circuit 101 proceeds to a step S107, whereas if not, the camera control circuit 101 proceeds to a step S108.

In the step S107, the camera control circuit 101 clips the control BV limit for the target BV (makes the target BV equal to the control BV limit), and proceeds to the step S108.

In the step S108, the camera control circuit 101 updates a live view exposure control value based on the target BV determined in the step S106 or S107, performs the live view exposure control, and proceeds to a step S109. Although the live view exposure control value can be determined independently of the shutter speed and the aperture value set for still image photographing, the step S108 makes the brightness of the through images displayed on the live view approximately equal to the brightness of a still image to be photographed.

In the step S109, the camera control circuit 101 determines whether or not the enlargement button of the operation input section 112 has been operated. If the enlargement button has not been operated (NO to the step S109), the camera control circuit 101 returns to the step S105, whereas if the enlargement button has been operated (YES to the step S109), the camera control circuit 101 proceeds to a step S110.

In the step S110, the camera control circuit 101 performs determination of a method of enlarged display. More specifically, in a case where the method is a method in which only a partial area is read out from the image pickup device 102 in advance and is displayed, the camera control circuit 101 proceeds to a step S111 to perform a photometry adjustment process. On the other hand, in a case where the method is a method in which after the full screen is read out from the image pickup device 102, an area to be enlarged is cut out and displayed, the camera control circuit 101 proceeds to a step S112 without performing the photometry adjustment process in the step S111.

In the step S111, the camera control circuit 101 performs the photometry adjustment process, and then proceeds to the step S112.

Here, the case where it is determined in the step S106 that the target BV exceeds the control BV limit (NO to the step S106) indicates that a still image cannot be photographed with a correct exposure by the current exposure setting. For example, in a case where an object of which the correct exposure is achieved at an EV of 9 is to be photographed, if the shutter speed is 1/8000 sec, an image photographed with the above-mentioned open F number setting and ISO sensitivity setting results in underexposure. In a case where the live view display is performed in this state, the live view exposure control target value is also a BV of 12. This makes it possible to display the brightness (exposure) of a still image to be photographed, in a simulated manner.

However, as described above, since the photometry luminance range of the live view display is set to ±3 steps (corresponding to EVs of ±3) due to the dynamic range characteristics, it is impossible in this condition to correctly measure the luminance of the object of which the correct exposure is achieved at an EV of 9. Therefore, in the step S111, the process for adjusting photometry of the live view so as to correctly determine a control BV required to correctly expose the object of which the correct exposure is achieved at an EV of 9. The photometry adjustment process will be described in detail hereinafter with reference to FIG. 3.

In the step S112, the camera control circuit 101 performs the enlarged display of live view, and proceeds to a step S113. There are a plurality of methods of displaying the live view in an enlarged manner, but in a case where only a partial area is read out from the image pickup device 102 in advance and an image corresponding to the partial area is enlarged and displayed, image data is generated only for the partial area of the object during the enlarged display, so that the photometry performed at a normal time cannot be performed. For this reason, the photometry result obtained before performing the enlarged display is locked (fixed). Further, during the enlarged display of live view, even when the brightness of an object changes, the target value of the brightness is not updated in both of the still image photographing and the live view display.

In the step S113, the camera control circuit 101 waits until the release button 114 of the operation input section 112 is half-pressed to switch on the first switch SW1, and when the first switch SW1 is switched on, the camera control circuit 101 proceeds to a step S114.

In the step S114, the camera control circuit 101 performs the setting shifting process as required, followed by terminating the present process. As described above, in the state where the shutter speed is set to 1/8000 sec, an object of which the correct exposure is achieved at an EV of 9 cannot be photographed with the correct exposure. In this case, by performing the setting shifting process, the shutter speed set by the user is temporarily shifted (changed) up to a range in which the correct exposure can be achieved. The setting shifting process will be described hereinafter with reference to FIG. 4.

Next, the photometry adjustment process performed in the step S111 in FIG. 2B will be described with reference to FIG. 3.

Figure 3:
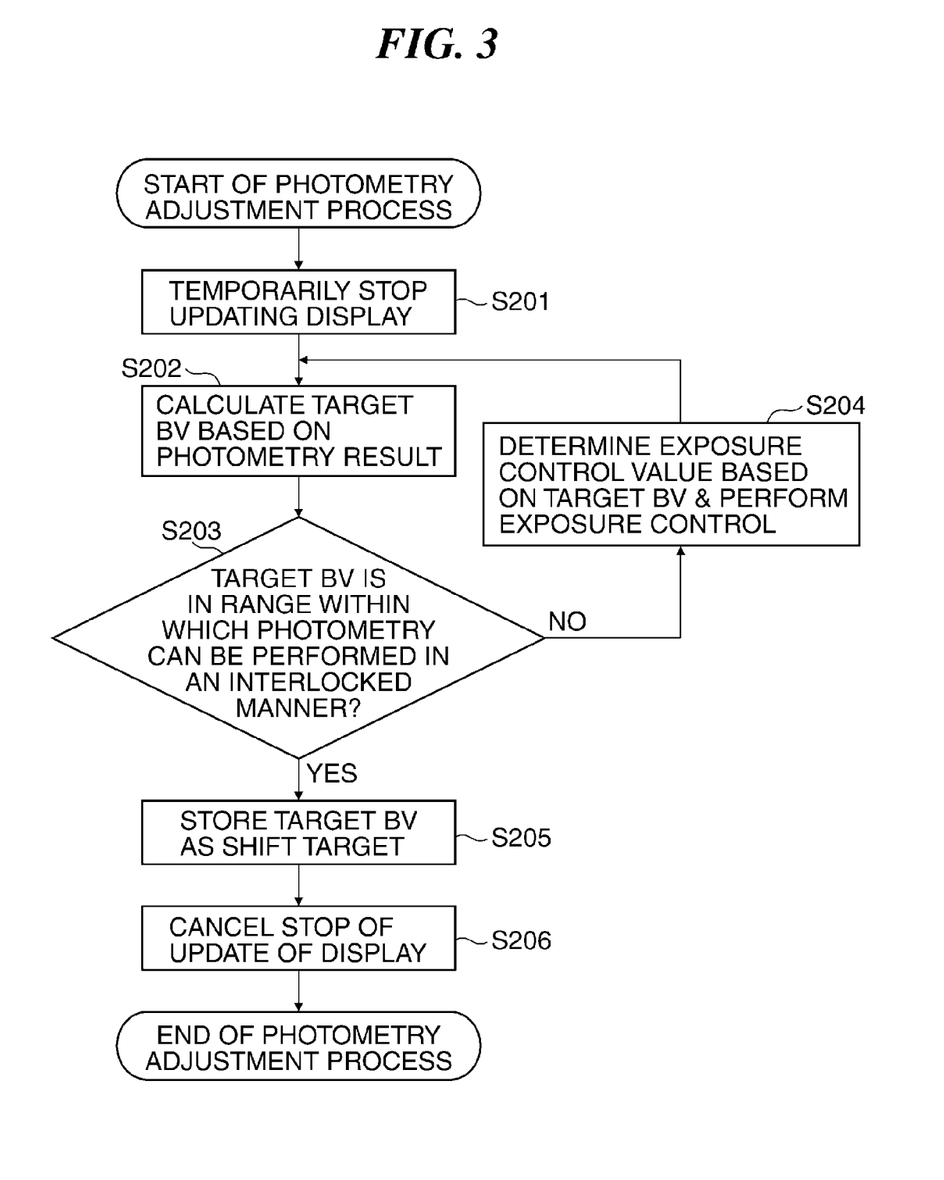
FIG. 3 is a flowchart of a photometry adjustment process performed in a step in FIG. 2B.

Referring to FIG. 3, in a step S201, the camera control circuit 101 temporarily stops updating the display of the live view image on the image display section 113, and proceeds to a step S202. As a result, a change of the live view exposure control value in the photometry adjustment process is not reflected on the image displayed on the image display section 113.

In the step S202, the camera control circuit 101 calculates the target BV based on the photometry result, and proceeds to a step S203.

In the step S203, the camera control circuit 101 determines whether or not the target BV calculated in the step S202 is in a range from the current live view control BV within which photometry can be performed in an interlocked manner. In the present embodiment, a range of ±3 steps (corresponding to EVs of ±3) from the live view control BV is defined as the range within which photometry can be performed in an interlocked manner. If the target BV calculated in the step S202 is beyond the range of EVs of ±3 from the current control BV, the camera control circuit 101 judges that the target BV is beyond the range within which photometry can be performed in an interlocked manner, and proceeds to a step S204, whereas if the target BV is within EVs of ±3 from the current control BV, the camera control circuit 101 proceeds to a step S205.

In the step S204, the camera control circuit 101 calculates the live view exposure control value based on the target BV, updates the live view exposure control value, and returns to the step S202. In the step S204, an amount of change from the current control BV may be limited to an EV of 3, or the exposure control value may be changed over an EV of 3. In the normal live view exposure control, as described with reference to FIG. 8, the control BV for the next frame is set in a range within which the photometry is performed for the current frame, whereby the live view exposure control is performed using only a range of somewhat accurate photometry results. This prevents exposure of the live view display from being largely changed beyond the correct exposure.

As for this photometry adjustment process, the update of the live view image display is stopped, whereby the view of the through image is not affected, and hence a control BV which is out of the photometry range can be set for the purpose of reducing a processing time period. Further, although the update of the live view control value is performed at certain time intervals in the normal live view control, the photometry and the update of the live view control value can also be performed at short time intervals for the purpose of reducing a processing time period.

Then, the camera control circuit 101 repeatedly executes the steps S202 and S203, and if it is determined that the target BV determined based on the photometry result is within the predetermined range (within EVs of ±3 in the present example) from the current live view control BV, the camera control circuit 101 proceeds to the step S205.

In the step S205, the camera control circuit 101 stores the target BV in the storage unit, such as a memory, as a shift target value, and proceeds to a step S206.

In the step S206, the camera control circuit 101 resets the control value to the live view control value before photometry adjustment, and permits the update of the live view image display on the image display section 113 to cancel the stop of the update, followed by terminating the present process.

In a state of the normal live view, user settings (values set by a user) in the various photographing modes, and the brightness of a still image to be photographed with the settings are shown on the live view display. Therefore, in a case where an accurate photometry result, i.e. the exposure target cannot be instantly obtained, depending on the user settings, by performing photometric operation and the live view exposure control a plurality of times while stopping the display of the frame, it is possible to obtain the target BV for the correct exposure.

Next, the setting shifting process performed in the step S114 in FIG. 2B will be described with reference to FIG. 4.

Figure 4:
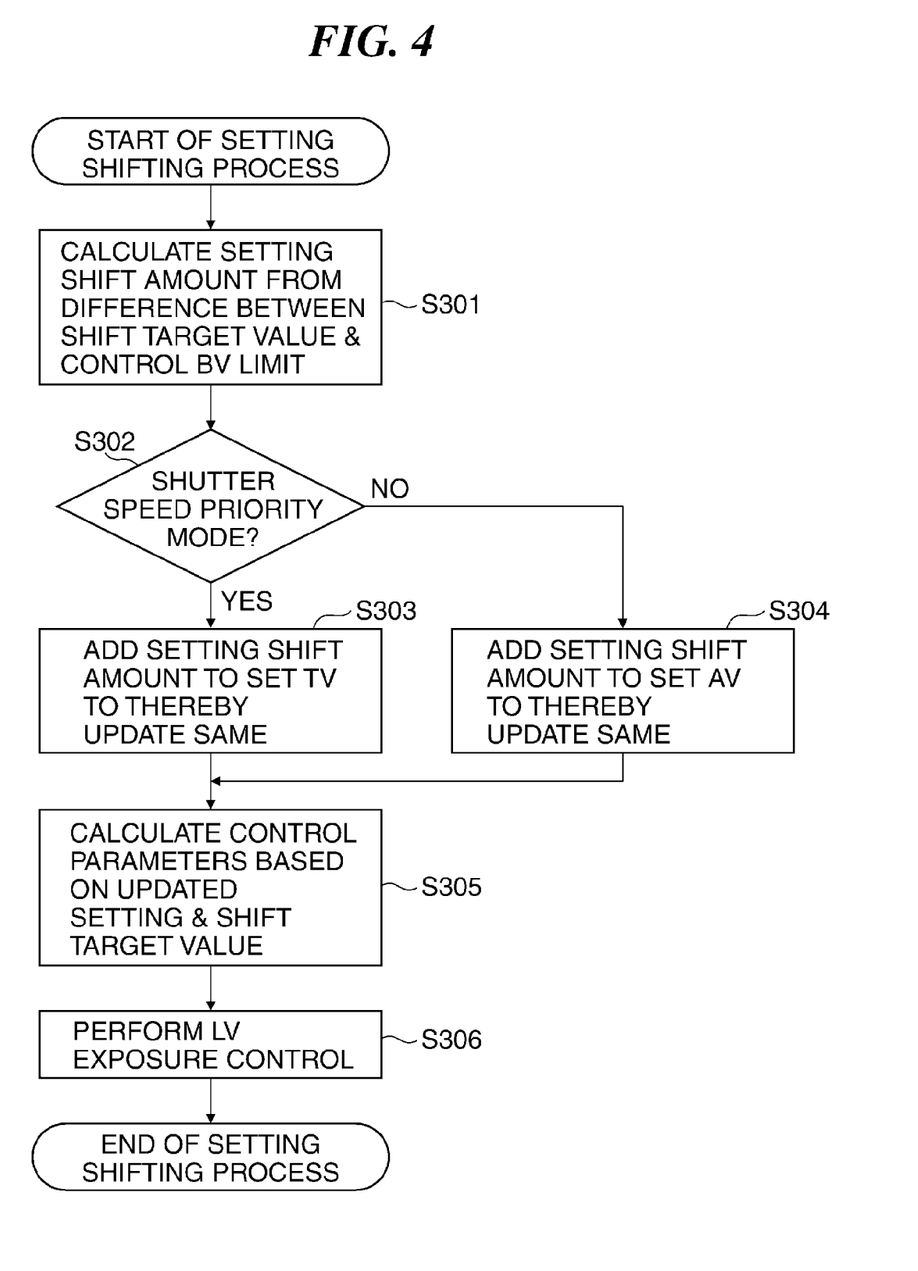
FIG. 4 is a flowchart of a setting shifting process performed in a step in FIG. 2B.

Referring to FIG. 4, in a step S301, the camera control circuit 101 calculates a difference between the control BV limit determined in the step S103 or S104 in FIG. 2A and the shift target value determined in the step S205 in FIG. 3.

Then, the camera control circuit 101 stores the calculated difference between the control BV limit and the shift target value in the storage unit, such as a memory, as a setting shift amount, and then proceeds to a step S302.

In the step S302, the camera control circuit 101 determines the photographing mode set via the operation input section 112, and if the photographing mode is the shutter speed priority mode, the camera control circuit 101 proceeds to a step S303, whereas if the photographing mode is the aperture priority mode, the camera control circuit 101 proceeds to a step S304.

In the step S303, the camera control circuit 101 updates the shutter speed setting by adding the setting shift amount to the shutter speed setting, and proceeds to a step S305.

In the step S304, the camera control circuit 101 updates the aperture setting by adding the setting shift amount to the aperture setting, and proceeds to the step S305. Although in the steps S303 and S304, the setting shift amount is added, there is a case where the difference between the control BV limit and the shift target value, which is the setting shift amount, is a negative value. In this case, the negative value is added in the steps S303 and S304, i.e. the absolute amount of the setting shift amount is subtracted. Therefore, the addition processing in the steps S303 and S304 includes subtraction processing depending on the setting shift amount.

In the step S305, the camera control circuit 101 calculates control parameters of the live view based on the setting updated in the step S303 or S304 and the shift target value (the target BV at which a still image is correctly exposed), and proceeds to a step S306.

In the step S306, the camera control circuit 101 performs the live view exposure control, followed by terminating the present process.

As described above, by determining both of a still image exposure target value which can be realized by a user setting and a still image exposure target value which can be realized as a result of the setting shifting process, before performing the enlarged display, it is possible to realize setting shift during the enlarged display.

As described above, in the present embodiment, even during the enlarged display of live view in which image data is generated only for a partial area of an object, it is possible to perform the display in a still image exposure simulation mode with a user setting according to each of the photographing modes. This makes it possible to realize setting shift in the state of enlarged display of live view, and even when the exposure parameter setting made by a user is inappropriate, it is possible to photograph a still image with correct exposure.

Next, a description will be given of a digital single-lens reflex camera as an image pickup apparatus according to a second embodiment of the invention with reference to FIGS. 5 to 7. The second embodiment has the same hardware configuration as that of the first embodiment, and the following description will be given using the same reference numerals for components corresponding to those of the first embodiment.

Figure 5A:
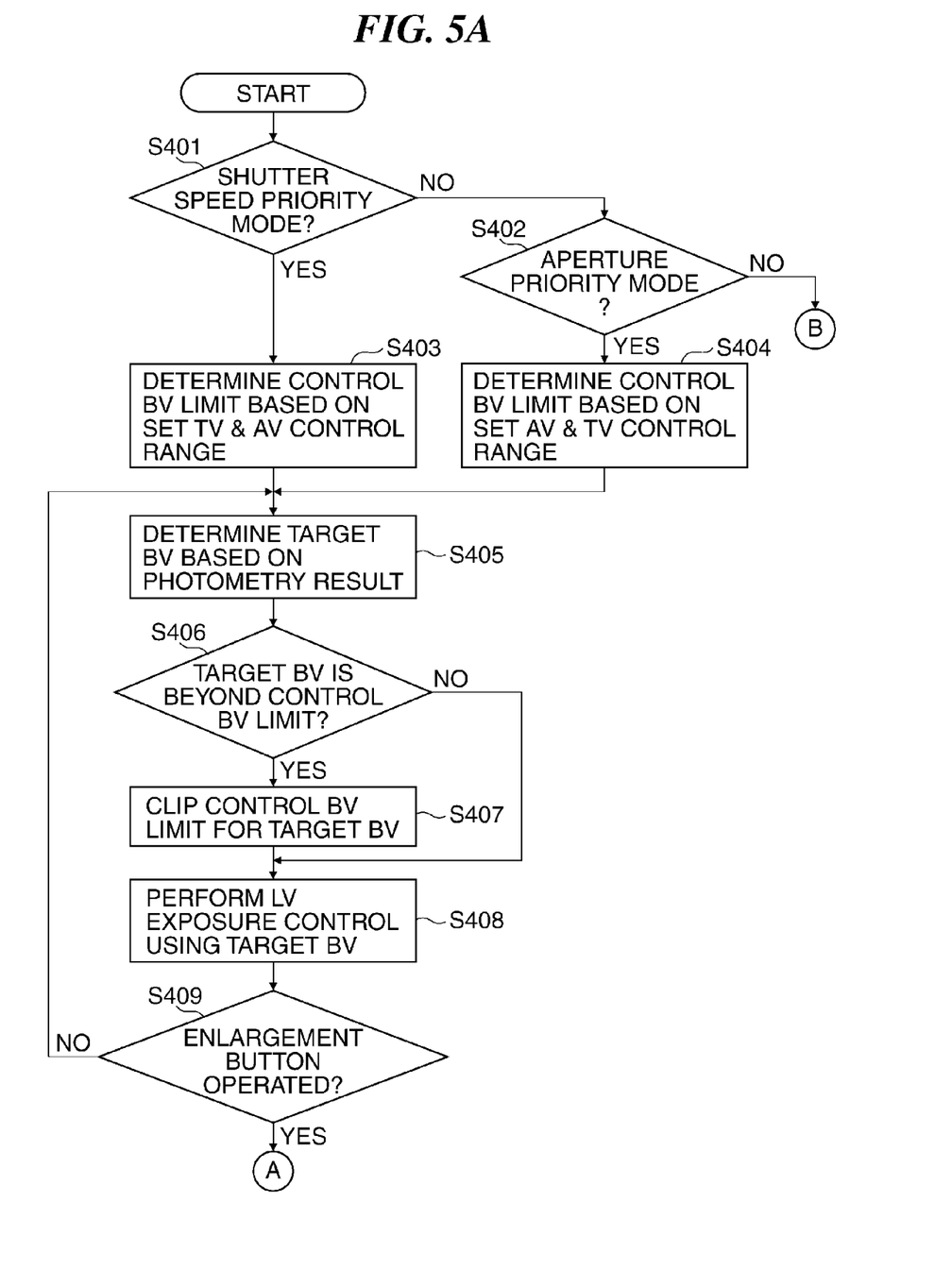
FIG. 5A is a flowchart of an exposure control process performed by a digital single-lens reflex camera as an image pickup apparatus according to a second embodiment of the invention.
Figure 5B:
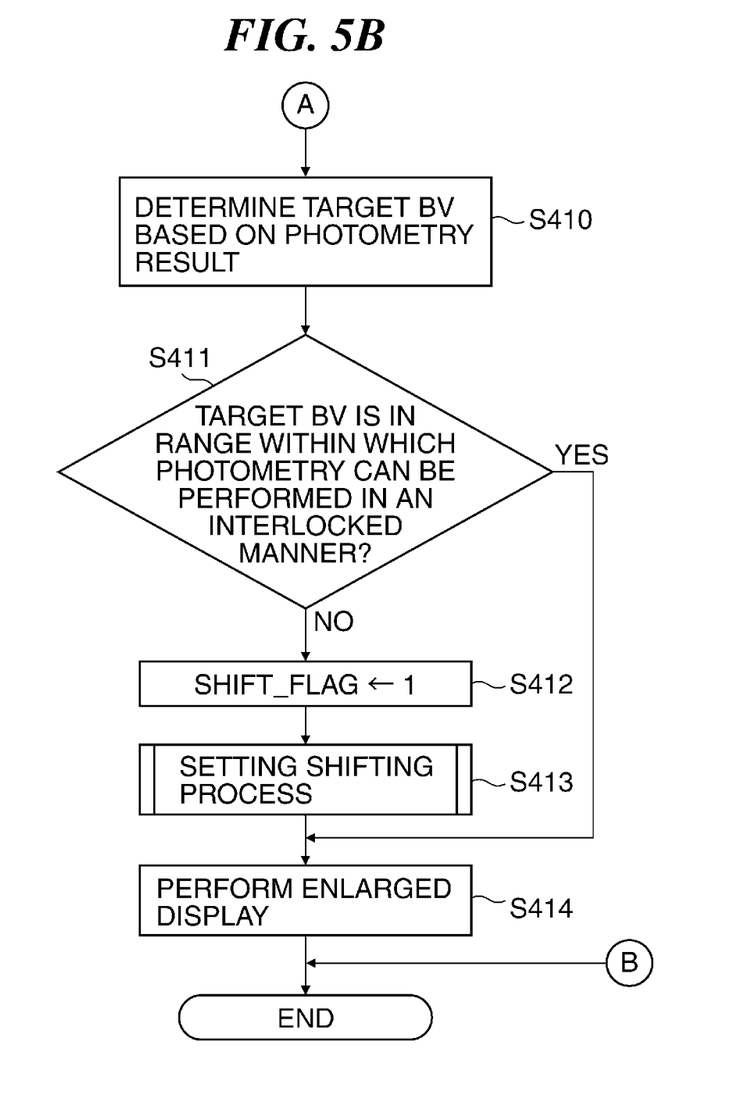
FIG. 5B is a continuation of FIG. 5A.

FIG. 5 is a flowchart of an exposure control process performed by the digital single-lens reflex camera as the image pickup apparatus according to the present embodiment. The exposure control process in FIG. 5 is performed by the CPU or the like of the camera control circuit 101, which loads a control program stored e.g. in the ROM, not shown, of the camera body 100, into the RAM, not shown.

Note that steps S401 to S409 in FIG. 5 are the same as the steps S101 to S109 in FIG. 2A, and hence description thereof is omitted.

Referring to FIGS. 5A and 5B, if an operation of the enlargement button on the operation input section 112 is detected in the step S409, the camera control circuit 101 proceeds to a step S410.

In the step S410, the camera control circuit 101 calculates the target BV which is the exposure control target, based on a result of photometry which has been actually performed, and proceeds to a step S411.

In the step S411, the camera control circuit 101 determines whether or not the target BV calculated in the step S410 is in a range from the current live view control BV within which photometry can be performed in an interlocked manner. In the present embodiment, a range of ±3 steps (corresponding to EVs of ±3) from the live view control BV is defined as the range within which photometry can be performed in an interlocked manner. Therefore, if the target BV is beyond the range of EVs of ±3 from the current control BV for live view, the camera control circuit 101 judges that the target BV is beyond the range within which photometry can be performed in an interlocked manner, and proceeds to a step S412, whereas if not, the camera control circuit 101 proceeds to a step S414.

In the step S412, the camera control circuit 101 sets a condition management flag SHIFT_FLAG to 1, and proceeds to a step S413.

In the step S413, the camera control circuit 101 performs the setting shifting process, and proceeds to the step S414. As described above, in the state where the shutter speed is set to $\frac{1}{8000}$ sec, it is impossible to photograph an object having a brightness for which the correct exposure is an EV of 9. In this case, the shutter speed set by the user is shifted to a range within which the correct exposure can be achieved, by performing the setting shifting process. The setting shifting process performed in this step will be described in detail, hereinafter with reference to FIG. 6.

In the step S414, the camera control circuit 101 performs the enlarged display of live view, followed by terminating the present process. In this step, only a partial area is read out from the image pickup device 102 in advance, and is displayed on the image display section 113.

Next, the setting shifting process in the step S413 in FIG. 5B will be described in detail with reference to FIG. 6.

Figure 6:
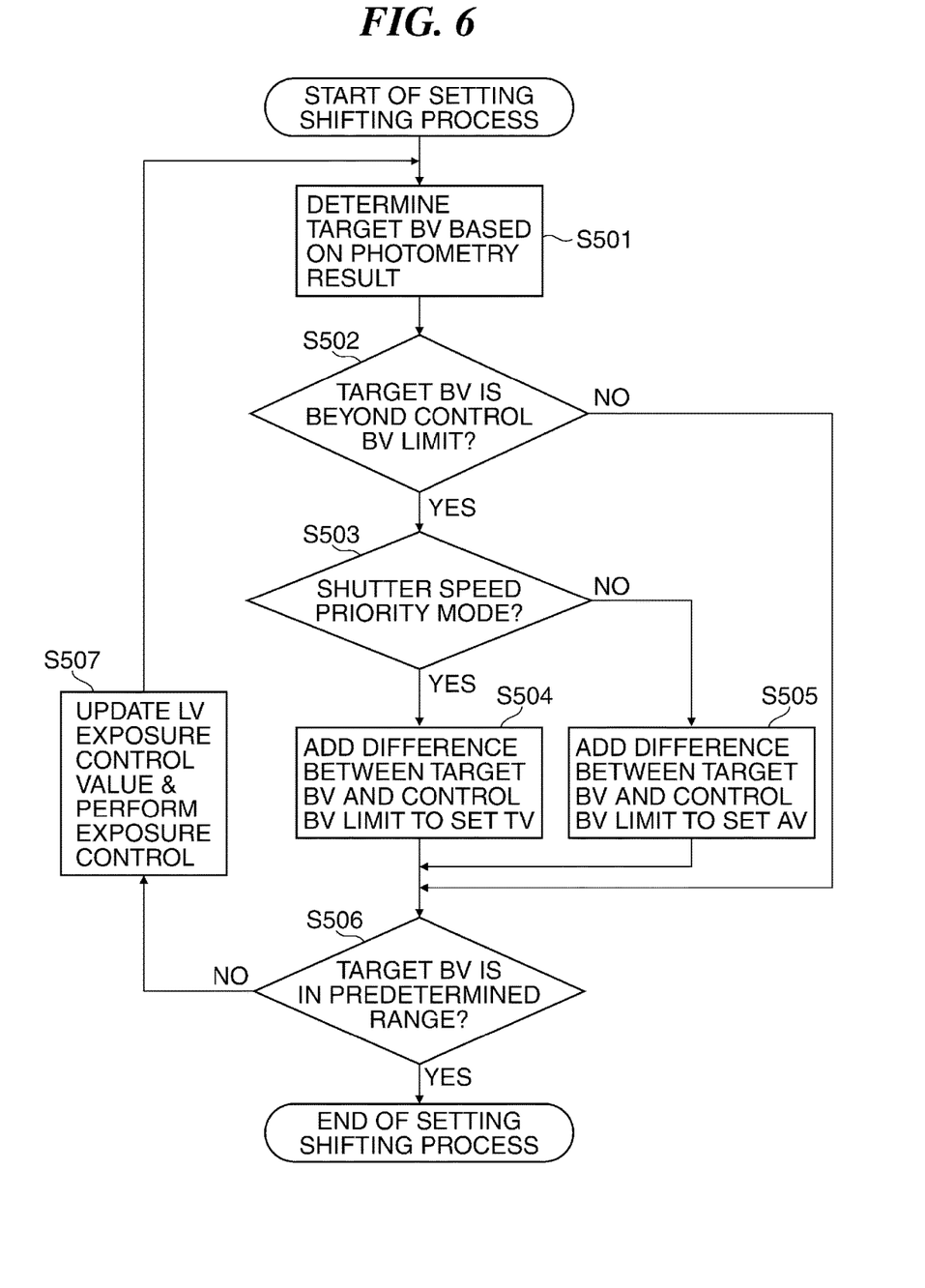
FIG. 6 is a flowchart of a setting shifting process performed in a step in FIG. 5B.

Referring to FIG. 6, in a step S501, the camera control circuit 101 determines the target BV for use in the still image photographing, based on the photometry result, and proceeds to a step S502.

In the step S502, the camera control circuit 101 determines whether or not the target BV determined in the step S501 exceeds the control BV limit. If the target BV exceeds the control BV limit, the camera control circuit 101 proceeds to a step S503, whereas if not, the camera control circuit 101 proceeds to a step S506. The control BV limit can be determined, e.g. in the shutter speed priority mode, based on the set shutter speed, the aperture control range of the lens unit 200 mounted on the camera body, 100 and the ISO sensitivity to be applied in the still image photographing.

In the step S503, it is determined whether or not the photographing mode set via the operation input section 112 is the shutter speed priority mode. If the photographing mode set via the operation input section 112 is the shutter speed priority mode, the camera control circuit 101 proceeds to a step S504, whereas if the photographing mode is the aperture priority mode, the camera control circuit 101 proceeds to a step S505.

In the step S504, the camera control circuit 101 adds a difference between the target BV and the control BV limit to the shutter speed setting, and proceeds to a step S506.

In the step S505, the camera control circuit 101 adds the difference between the target BV and the control BV limit to the aperture setting, and proceeds to the step S506.

In the step S506, the camera control circuit 101 determines whether or not the target BV is within a predetermined range (EVs of ±3 in the present example) from the current live view control BV, if the target BV is beyond the predetermined range, the camera control circuit 101 proceeds to a step S507, whereas if the target BV is within the predetermined range, the camera control circuit 101 terminates the present process.

In the step S507, the camera control circuit 101 updates the live view exposure control value by shifting the live view exposure control value to the end of the range within which photometry can be performed in an interlocked manner, i.e. by an EV of 3, and returns to the step S501.

Next, a description will be given, with reference to FIG. 7, of a process performed when the release button 114 is half-pressed to switch on the first switch SW1 in a state where the enlarged display of live view is being performed.

Figure 7:
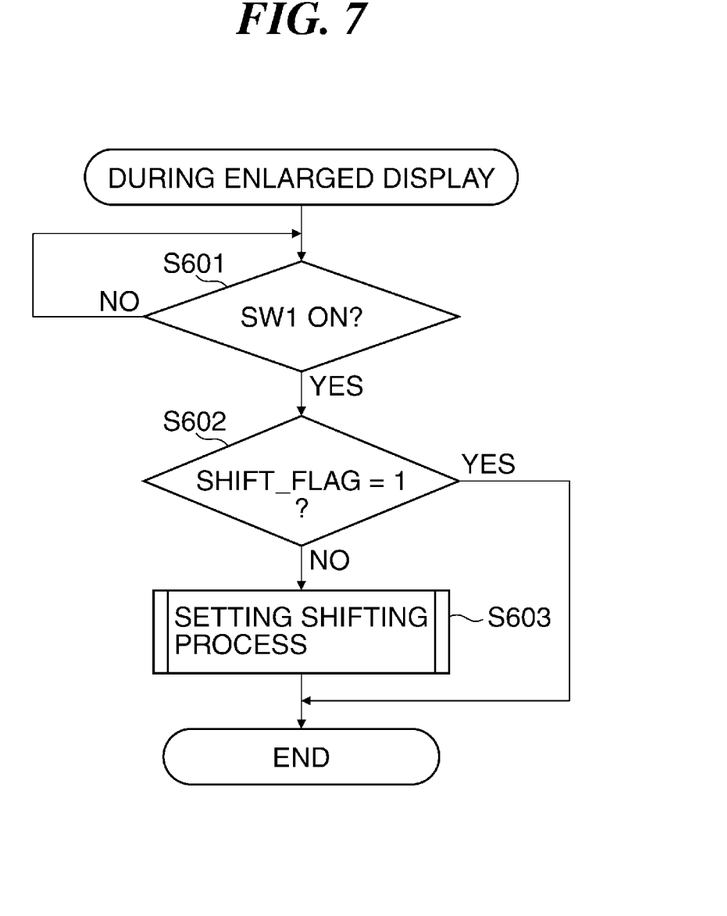
FIG. 7 is a flowchart of a process performed when a release button is half-pressed to switch on a first switch in an enlarged display state of live view.

Referring to FIG. 7, in a step S601, if the first switch SW1 is switched on, the camera control circuit 101 proceeds to a step S602.

In the step S602, the camera control circuit 101 refers to the condition management flag SHIFT_FLAG which is set to 1 in the step S412 in FIG. 5B. Then, if the flag SHIFT_FLAG is equal to 1, the camera control circuit 101 terminates the present process because the setting shifting process has already been performed, whereas if the flag SHIFT_FLAG value is not equal to 1, the camera control circuit 101 proceeds to a step S603.

In the step S603, the camera control circuit 101 performs the setting shifting process, in the same manner as described with reference to FIG. 6, followed by terminating the present process.

In the present embodiment, when the enlargement button is operated in a state where a still image cannot be photographed with correct exposure due to a user setting, an exposure target value at which correct exposure is performed for a still image is determined while changing the exposure control value in a display state of live view in an exposure simulation mode. This makes it possible to perform the enlarged display of live view after executing the setting shifting process As described above, in the present embodiment, even when the display is shifted to the enlarged display in which image data is generated for only a partial area of an object, it is possible to shift the display to the enlarged display state after executing the setting shifting function. As a result, even when the exposure parameter setting made by a user is inappropriate, it is possible to photograph a still image with correct exposure from the enlarged display state. Other configurations and advantageous effects are the same as provided by the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-255034 filed Dec. 17, 2014, which is hereby incorporated by reference herein in its entirety.

What is claimed is:

1. An image pickup apparatus comprising:
   an image pickup device;
   at least one processor that executes a program or programs stored in at least one non-transitory memory so as to function as units comprising:
   (1) a photometry unit configured to perform photometry of an image acquired by performing image pickup by said image pickup device;
   (2) an exposure control unit configured to perform exposure control based on a result of photometry by said photometry unit; and
   (3) a display control unit configured to cause the image acquired by performing image pickup by said image pickup device to be displayed on an image display section,
   wherein in a case where an enlargement instruction is received from a user when a plurality of images acquired by performing image pickup by said image pickup device are being sequentially displayed on the image display section, said display control unit causes an enlarged image corresponding to a partial area of an object area as a target of image pickup by said image pickup device to be displayed on the image display section, and
   wherein in a case where an exposure is to be changed when the enlarged image is being displayed on the image display section, said exposure control unit changes the exposure, based on a result of photometry of the image acquired by performing image pickup by said image pickup device before the enlarged image is displayed on the image display section.

2. The image pickup apparatus according to claim 1, wherein in a case where the enlargement instruction is received from the user when a plurality of images acquired by performing image pickup by said image pickup device based on a first exposure are being sequentially displayed on the image display section, said exposure control unit changes the exposure to a second exposure different from the first exposure before the enlarged image is displayed on the image display section, and wherein in a case where the exposure is to be changed when the enlarged image is being displayed on the image display section, said exposure control unit changes the exposure, based on a result of photometry of an image acquired by performing image pickup based on the second exposure by said image pickup device.

3. The image pickup apparatus according to claim 2, wherein said display control unit does not cause an image acquired by performing image pickup by said image pickup device based on the second exposure to be displayed on the image display section.

4. The image pickup apparatus according to claim 1, wherein the first exposure is set based on an exposure control value selected by the user.

5. The image pickup apparatus according to claim 4, wherein the second exposure is an exposure closer to a standard exposure than the first exposure.

6. The image pickup apparatus according to claim 1, wherein when the enlarged image is displayed on the image display section, an image of a partial area, which corresponds to the enlarged image, of the object area is read out from said image pickup device.

7. The image pickup apparatus according to claim 1, wherein in a case where the enlargement instruction is received from the user when a plurality of images acquired by performing image pickup by said image pickup device based on a first exposure are being sequentially displayed on the image display section, said exposure control unit sequentially changes the exposure to a plurality of exposures different from the first exposure before the enlarged image is displayed on the image display section, and wherein in a case where the exposure is to be changed when the enlarged image is being displayed on the image display section, said exposure control unit changes the exposure, based on a result of photometry of an image acquired by performing image pickup based on one of the plurality of exposures by said image pickup device.

8. The image pickup apparatus according to claim 7, wherein an exposure time interval at which image pickup of the plurality of images is performed by said image pickup device by sequentially changing the exposure to the plurality of exposures before the enlarged image is displayed on the image display section is shorter than an image update time interval of the image display section.

9. The image pickup apparatus according to claim 1, wherein the enlarged image is not an image which is a partial area cut out from an image read out from said image pickup device.

10. An image pickup apparatus comprising:
an image pickup device;
at least one processor that executes a program or programs stored in at least one non-transitory memory so as to function as units comprising:
(1) a photometry unit configured to perform photometry of an image acquired by performing image pickup by said image pickup device;
(2) an exposure control unit configured to perform exposure control based on a result of photometry by said photometry unit; and (3) a display control unit configured to cause the image acquired by performing image pickup by said image pickup device to be displayed on an image display section, wherein in a case where an enlargement instruction is received from a user when a plurality of images acquired by performing image pickup by said image pickup device are being sequentially displayed on the image display section, said display control unit causes an enlarged image corresponding to a partial area of an object area as a target of image pickup by said image pickup device to be displayed on the image display section, and wherein in a case where an instruction for still image photographing is received when the enlarged image is being displayed on the image display section, said exposure control unit determines an exposure at a time of still image photographing based on a result of photometry of the image acquired by performing image pickup by said image pickup device before the enlarged image is displayed on the image display section.

11. A method of controlling an image pickup apparatus including an image pickup device and an image display section, the method comprising:
performing photometry of an image acquired by performing image pickup by the image pickup device;
performing exposure control based on a result of the photometry; and
displaying the image acquired by performing image pickup by the image pickup device on the image display section,
wherein said displaying includes, in a case where an enlargement instruction is received from a user when a plurality of images acquired by performing image pickup by the image pickup device are being sequentially displayed on the image display section, displaying an enlarged image corresponding to a partial area of an object area as a target of image pickup by the image pickup device on the image display section, and
wherein the exposure control includes, in a case where the exposure is to be changed when the enlarged image is being displayed on the image display section, changing the exposure based on a result of photometry of the image acquired by performing image pickup by the image pickup device before the enlarged image is displayed on the image display section.

12. A method of controlling an image pickup apparatus including an image pickup device and an image display section, the method comprising:
performing photometry of an image acquired by performing image pickup by the image pickup device;
performing exposure control based on a result of the photometry; and
displaying the image acquired by performing image pickup by the image pickup device on the image display section,
wherein said displaying includes, in a case where an enlargement instruction is received from a user when a plurality of images acquired by performing image pickup by the image pickup device are being sequentially displayed on the image display section, displaying an enlarged image corresponding to a partial area of an object area as a target of image pickup by the image pickup device on the image display section, and
wherein the exposure control includes, in a case where an instruction for still image photographing is received when the enlarged image is being displayed on the image display section, determining an exposure at a time of still image photographing based on a result of photometry of the image acquired by performing image pickup by the image pickup device before the enlarged image is displayed on the image display section.

* * * * *